United States Patent [19]

Remington

[11] Patent Number: 4,598,889
[45] Date of Patent: Jul. 8, 1986

[54] HINGE ARRANGEMENT FOR MODEL AIRCRAFT

[76] Inventor: Richard C. Remington, P.O. Box 314, Pompton Plains, N.J. 07444

[21] Appl. No.: 636,692

[22] Filed: Aug. 1, 1984

[51] Int. Cl.⁴ .............................................. B64C 9/02
[52] U.S. Cl. ...................................... 244/87; 16/260; 244/130; 244/131; 446/31
[58] Field of Search ........................... 16/260; 446/31; 244/131, 89, 87, 130

[56] References Cited

U.S. PATENT DOCUMENTS

| | | | |
|---|---|---|---|
| 770,595 | 9/1904 | Lovette | 16/260 |
| 1,496,466 | 6/1924 | Jackson | 16/260 |
| 3,087,257 | 4/1963 | White | 446/31 |

Primary Examiner—Galen Barefoot
Attorney, Agent, or Firm—S. A. Giarratana

[57] ABSTRACT

A hinge for control surfaces of model aircraft, comprising a first hinge member formed with a lateral keyhole slot for removably engaging a lateral barbell portion of a second hinge member. The first hinge member is preferably attached to a fixed structure of the aircraft with the second hinge member attached to a control surface, such as, an aileron or elevator. Relative rotation of one hinge member with respect to the other hinge member allows the lateral barbell portion to operatively engage or disengage from the lateral keyhole slot. When engaged, the operatively coacting hinge members provide rotating hinge action between the control surface and the fixed structure of the aircraft.

1 Claim, 6 Drawing Figures

HINGE ARRANGEMENT FOR MODEL AIRCRAFT

BACKGROUND AND SUMMARY OF THE INVENTION

In general, radio controlled or "U" controlled model aircraft require hinged control surfaces identical in operation to those used in full scale aircraft to control pitch, yaw and roll. The hinge arrangement of the present invention performs such functions while eliminating a number of drawbacks inherent in presently used model aircraft hinges.

Current conventional hinges used on model aircraft structure are generally a one piece solid plastic flex type or a pair of solid plastic members joined by a metal pin. To operatively attach these hinges to the aircraft requires slotting the edge of the fixed structure of the aircraft as well as the edge of the associated control surface to insert and cement therein the respective tongue portion of the coacting hinge members. To assure that each tongue portion is secure within its respective slot, a pin or dowel is inserted through the aircraft structure perpendicular to and through each of the tongue portions.

Although conventional hinges provided with a metal pin can be disassembled after mounting, it is a tedious and difficult operation especially in the field, often resulting in damage to the hinge and control surface. It is not uncommon to have a conventional hinge come apart from vibration during flight with obvious disastrous results to the model aircraft.

The present invention is an improved hinge arrangement eliminating many of the problems associated with conventional model aircraft hinges. In a preferred embodiment of the present invention, an improved hinge arrangement comprises a hinge member attached to a fixed structure of the model aircraft and formed with a lateral keyhole slot adapted to removably engage a lateral barbell portion of a coacting hinge member attached to a control surface of the aircraft. The present invention provides a hinge arrangement with a relatively large mounting surface to attach the individual hinge members to the aircraft without the requirement for slotting the edge of the fixed structure of the model aircraft and the edge of the associated control surface. The coacting hinge members of the present invention are manually and separately aligned in an operative configuration on the associated aircraft structures and then their respective mounting surfaces are cemented directly to the aircraft without the necessity of modifying aircraft structure. Whenever necessary, the two coacting hinge members may be disengaged by simply rotating one member relative to the other a predetermined amount in either direction, to allow the lateral barbell portion of the hinge member attached to the control surface to be withdrawn from the lateral keyhole slot in the hinge member attached to the fixed structure of the aircraft. Assembling the hinge is accomplished by reversing the procedure to disengage the hinge members as hereinafter disclosed.

DETAILED DESCRIPTION

Figure 1:
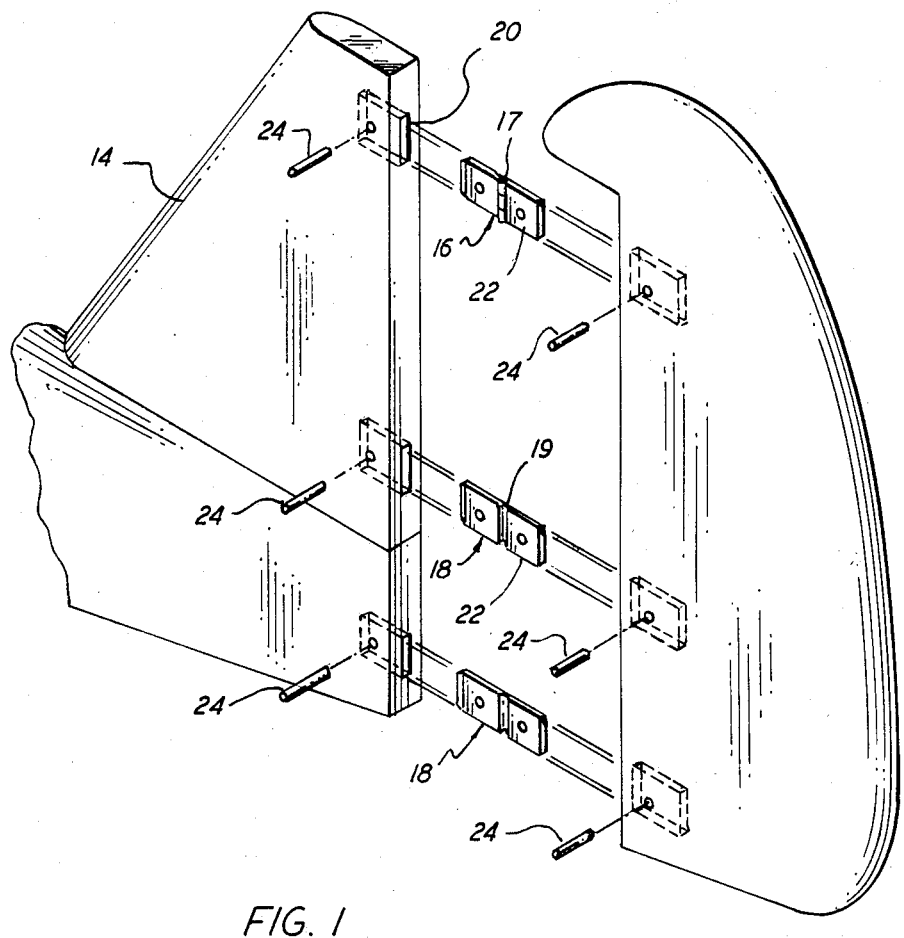
FIG. 1 is an exploded assembly drawing of a conventional hinge arrangement on a model aircraft.

For purposes of illustrating a conventional hinge arrangement, FIG. 1 shows a model aircraft tail structure comprising a vertical control surface 12 operatively hinged to a fixed vertical tail structure 14 by a number of conventional hinges, a pin hinge 16 and a pair of plastic flex hinges 18. To operatively attach conventional hinges to the aircraft tail structure, opposed and aligned slots 20 are required in the vertical structure 14 and in the control surface 12; each slot adapted to receive and have cemented therein a tongue portion 22 of each hinge. A pin or dowel 24 is provided to assist in anchoring each tongue portion in place. The conventional pin hinge 16 consists of opposing tongue portions 22, generally fabricated out of plastic, hinged together with a metal pin 17. The plastic flex hinge 18 is fabricated from a single plastic member with a thin middle portion 19 forming an integral flex section between the tongue portions 22.

Figure 2:
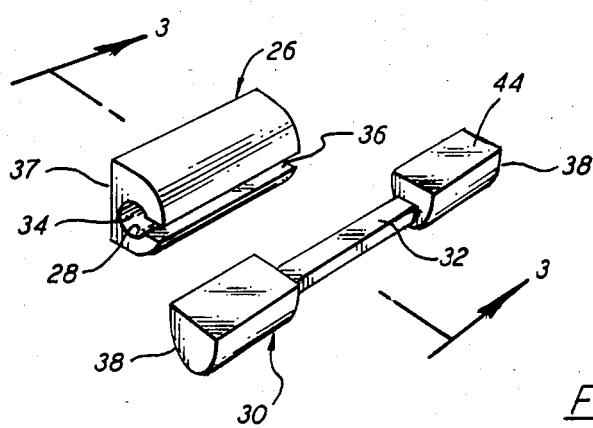
FIG. 2 is a perspective view of a preferred embodiment of a hinge of the present invention.
Figure 3:
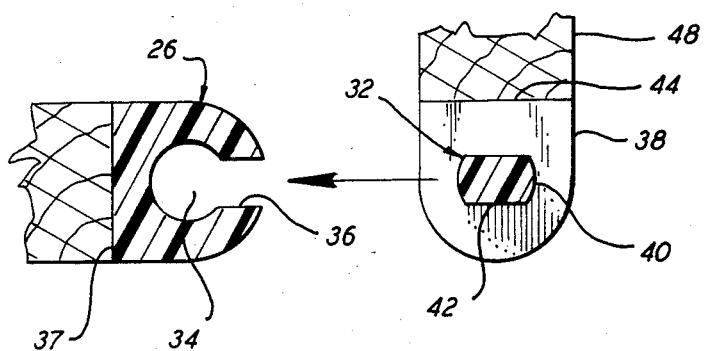
FIGS. 3 and 3a are cross-sectional views illustrating steps in the operation of the hinge of the present invention.
Figure 3A:
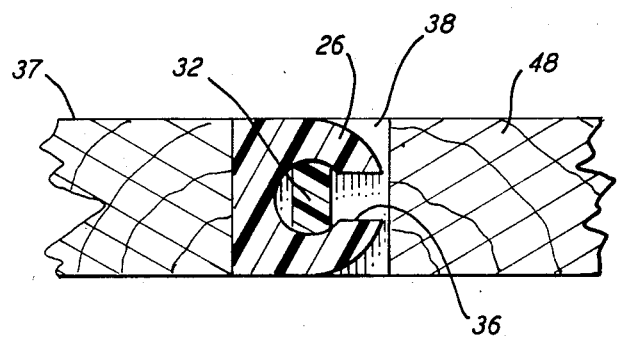

The elements of the preferred embodiment are shown in FIG. 2 wherein a first hinge member 26 is provided with a lateral keyhole slot 28 and a second hinge member 30 is provided with a lateral barbell member 32. Specifically, the hinge member 26 is a molded plastic member configured with a substantially "D" cross-section in which the keyhole slot 28 consists of a lateral aperture 34 and a lateral slot 36. In addition, the member 26 is provided with a large mounting surface 37. The hinge member 30 is also a plastic molded structure consisting of a pair of substantially "D" cross-section end portions 38 connected by the lateral barbell member 32. FIG. 3 shows the lateral barbell with a substantially rectangular cross-section fabricated with opposing arcuate surfaces 40, as well as opposing parallel surfaces 42 parallel to a flat mounting surface 44 provided on each of the "D" cross-section ends 38. The parallel flat surfaces 42 are dimensioned to pass through the lateral slot 36 of hinge member 26 when properly aligned, as shown in FIGS. 3 and 3a.

Figure 4:
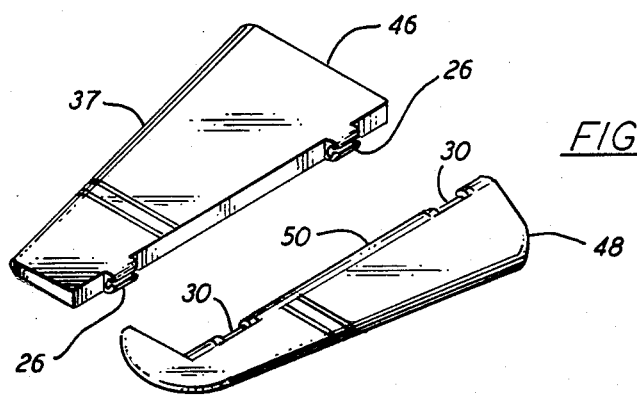
FIGS. 4 and 4a illustrate steps in the assembly of the hinge of the present invention.
Figure 4A:
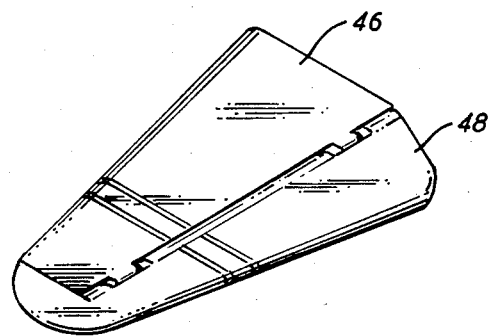

FIGS. 4 and 4a illustrate the preferred hinge arrangement wherein a number of the first hinge members 26 are mounted on a fixed horizontal tail structure 46 of the model aircraft and the coacting second hinge members 30 are mounted on a horizontal tail control surface 48. To assemble each hinge of the present invention, the control surface 48 is rotated approximately 90 degrees in either direction, to line up the flat surfaces 42 of the lateral barbell member 32 with the lateral slot 36 of the lateral keyhole slot 28, as shown in FIGS. 3 and 3a, allowing the control surface 48 to be easily and quickly removed and replaced with respect to the tail structure 46. The close fit between the arcuate surfaces 40 of the lateral barbell member 32 and the interior surface of the substantially cylindrical lateral aperture 34 form the smooth rotating hinge action of the present invention. Once the control surface 48 is in place, and a conventional control surface push-rod (not shown) is attached to a standard control horn (also not shown), the control surface 48 is limited in arcuate movement to approximately plus or minus 45 degrees, thereby preventing any separation of the hinge members 26 and 30. The present invention utilizes relative rotation of the hinge members without axial motion to attach or remove the control surface which is desirable in many elevator and aileron applications where axial motion is restricted.

Referring again to the hinge arrangement shown in FIGS. 4 and 4a, hinge members of the present invention with their large mounting surfaces 37 and 44 eliminate the need for providing slots in the aircraft structure. The hinge members 26 and 30 are cemented with an instant glue, such as cyano-acrylate, or the like, to the horizontal tail structure 46 and to the control surface 48, respectively. For convenience in assembling the control surfaces of the model aircraft, the horizontal tail control surface 48 is positioned in its operating position, as shown in FIG. 4a, relative to the structure 46, with the assembled hinge member 26 and 30 placed as operatively required therebetween. Referring to FIG. 3a, the hinge members are then cemented to their respective model aircraft structure by applying glue directly at locations 'A' and 'B' for hinge member 26 and at locations 'C' and 'D' for hinge member 30. Once the glue has set, the control surface 48 can be rotated 90 degrees in either direction to permit the withdrawal of the lateral barbell 32 from the lateral aperture 34. As shown in FIGS. 4 and 4a, if deemed desirable for aerodynamic purposes, filler blocks 50 of appropriate dimensions and material may be provided in the gaps between the control surface and the fixed horizontal tail structure.

The hinge arrangement of the present invention allows the hinge members 26 and 30 to be mounted before covering and painting the model aircraft. In addition, the invention permits removal and replacement of the control surfaces as often as desired without tools and without damage to the hinge members, thereby facilitating the covering, painting, repairing, transporting, and storing of the model aircraft. Further, the repair of a damaged model aircraft is greatly facilitated since broken control surfaces are easily replaceable. Also, since the hinge members are fabricated from plastic, radio noise problems are eliminated in radio controlled models.

Accordingly, the hinge arrangement of the present invention provides a simple, inexpensively constructed, but highly effective hinge with a minimum of structural components for model aircraft, easy to install and operate.

Although the invention has been described in conjunction with the foregoing specific embodiment, many alternatives, variations and modifications will be apparent to those of ordinary skill in the art. Those alternatives, variations and modifications are intended to fall within the spirit and scope of the appended claims.

What is claimed is:

1. In a model aircraft, the combination of a fixed structure of the aircraft having a number of first hinge members attached thereto with a controlled surface of the aircraft having a number of second hinge members attached thereto, wherein one of said first hinge members is adapted to operatively engage one of said second hinge members, each of said first hinge members provided with a lateral keyhole slot formed with a substantially cylindrical lateral aperture, each of said second hinge members having a lateral barbell portion removably engaging said lateral keyhole slot of an operatively associated first hinge member, whereby a predetermined displacement of each of said operatively associated lateral keyhole slots retains each of said lateral barbell portions within each of said operatively associated substantially cylindrical lateral apertures, thereby providing a rotating hinge action for said controlled surface relative to said fixed structure, each of said hinge members provided with relatively large mounting surfaces for attaching said members without structural alterations to said fixed structure and to said controlled surface, filler block means provided on said controlled surface between adjacent second hinge members substantially eliminating any gap between the controlled surface and the fixed structure of the aircraft, each of said hinge members fabricated from a plastic material to eliminate radio noise problems in radio controlled model aircraft and to facilitate cementing with instant glue onto said fixed structure and said controlled surface, and control means attached to said controlled surface limiting its arcuate movement to prevent separation of said first and second hinge means.

* * * * *